US012611014B2

(12) United States Patent
Liao et al.

(10) Patent No.: US 12,611,014 B2
(45) Date of Patent: Apr. 28, 2026

(54) LUGGAGE FORMED BY COMPOSITE MATERIAL AND MANUFACTURING METHOD THEREOF

(71) Applicant: QUEST COMPOSITE TECHNOLOGY LIMITED, Causeway Bay (HK)

(72) Inventors: Yuan-Hong Liao, Causeway Bay (HK); Su-Chun Wu, Causeway Bay (HK)

(73) Assignee: QUEST COMPOSITE TECHNOLOGY LIMITED, Causeway Bay (HK)

( * ) Notice: Subject to any disclaimer, the term of this patent is extended or adjusted under 35 U.S.C. 154(b) by 381 days.

(21) Appl. No.: 18/346,629

(22) Filed: Jul. 3, 2023

(65) Prior Publication Data

US 2023/0337795 A1     Oct. 26, 2023

Related U.S. Application Data

(62) Division of application No. 17/122,597, filed on Dec. 15, 2020, now abandoned.

(30) Foreign Application Priority Data

Nov. 12, 2020    (CN) .......................... 202011260428.1

(51) Int. Cl.
B29C 70/44 (2006.01)
A45C 5/02 (2006.01)
(Continued)

(52) U.S. Cl.
CPC .................. A45C 5/02 (2013.01); A45C 5/03 (2013.01); A45C 13/36 (2013.01); B29C 51/10 (2013.01);
(Continued)

(58) Field of Classification Search
CPC ..... B29C 70/446; B29C 70/44; B29C 70/342; B29C 33/505; B29C 33/50
See application file for complete search history.

(56) References Cited

U.S. PATENT DOCUMENTS 3,544,418 A * 12/1970 Holtzman ................. A45C 5/02
                                                          190/125
3,608,682 A * 9/1971 Newton .................... A45C 5/02
                                                          190/125
(Continued)

FOREIGN PATENT DOCUMENTS

TW          M579915 U     7/2019
TW          202003202 A   1/2020

*Primary Examiner* — Matthew J Daniels
(74) *Attorney, Agent, or Firm* — MUNCY, GEISSLER, OLDS & LOWE, P.C.

(57) ABSTRACT

A method for manufacturing a luggage formed by composite material includes the steps: A) using a vacuum molding method to make a thermoplastic sheet into a shell; B) placing the shell in an inner cavity mold area of a heating mold to correspond the outer surface of the shell to the inner wall surface of the inner cavity mold area; C) setting the outer surface of the thermosetting carbon fiber plastic layer on the inner surface of the shell; D) setting the reinforcing layer on the inner surface of the thermosetting carbon fiber plastic layer at the location corresponding to the corner of the shell; and E) placing an airbag in the receiving area of the shell and inflating the airbag to support the inner surface of the thermosetting carbon fiber plastic layer and the reinforcing layer.

8 Claims, 14 Drawing Sheets

(51) Int. Cl.

| | |
|---|---|
| *A45C 5/03* | (2006.01) |
| *A45C 13/36* | (2006.01) |
| *B29C 51/10* | (2006.01) |
| *B29C 70/54* | (2006.01) |
| *B32B 1/00* | (2006.01) |
| *B32B 5/02* | (2006.01) |
| *B32B 5/26* | (2006.01) |
| *B32B 15/14* | (2006.01) |
| *B29K 101/10* | (2006.01) |
| *B29K 101/12* | (2006.01) |
| *B29K 307/04* | (2006.01) |
| *B29L 31/00* | (2006.01) |

(52) U.S. Cl.
CPC .............. *B29C 70/44* (2013.01); *B29C 70/54* (2013.01); *B32B 1/00* (2013.01); *B32B 5/02* (2013.01); *B32B 5/26* (2013.01); *B32B 15/14* (2013.01); *A45C 2005/037* (2013.01); *B29K 2101/10* (2013.01); *B29K 2101/12* (2013.01); *B29K 2307/04* (2013.01); *B29L 2031/712* (2013.01); *B32B 2260/021* (2013.01); *B32B 2260/046* (2013.01); *B32B 2262/106* (2013.01); *B32B 2439/40* (2013.01)

(56) References Cited

U.S. PATENT DOCUMENTS

| | | | | | |
|---|---|---|---|---|---|
| 4,201,823 | A | * | 5/1980 | Russell | ................... B29C 70/44 264/137 |
| 4,959,189 | A | * | 9/1990 | Rohrbacher | ........... B32B 27/08 264/510 |
| 5,037,599 | A | * | 8/1991 | Olson | .................... B29C 70/44 425/389 |
| 5,132,166 | A | * | 7/1992 | Adams | ..................... A45C 5/02 190/125 |
| 5,407,610 | A | * | 4/1995 | Kohama | ................. B29C 70/44 264/516 |
| 5,637,330 | A | * | 6/1997 | Younessian | ............. B29C 51/30 425/441 |
| 7,431,962 | B2 | * | 10/2008 | De Winter | .............. B29C 44/06 427/133 |
| 9,162,396 | B2 | * | 10/2015 | Coxon | .................... B29C 70/56 |
| 10,981,339 | B2 | * | 4/2021 | Liao | ........................ B29C 43/10 |
| 2006/0175730 | A1 | * | 8/2006 | Merkel | ................. B29C 33/505 264/324 |
| 2007/0098930 | A1 | * | 5/2007 | Krogager | ................ B29C 70/44 264/258 |
| 2008/0277049 | A1 | * | 11/2008 | Roebroeks | ........ B29C 66/81455 156/381 |
| 2011/0308907 | A1 | * | 12/2011 | Hou | ......................... B29C 51/10 190/124 |
| 2013/0213752 | A1 | * | 8/2013 | Meersschaert | ......... B29D 22/00 190/125 |
| 2015/0283730 | A1 | * | 10/2015 | Kakimoto | ............... B29B 11/12 264/138 |
| 2017/0265611 | A1 | * | 9/2017 | Vandevelde | .......... B29C 70/465 |
| 2018/0281319 | A1 | * | 10/2018 | Sebastian | ................ B32B 37/14 |
| 2019/0345299 | A1 | * | 11/2019 | Tice | .......................... C08J 5/042 |

\* cited by examiner

S1-5

72

60

50    64    211    213          30    60

S1-6

10

21    211    213          217

215    30    50

LUGGAGE FORMED BY COMPOSITE MATERIAL AND MANUFACTURING METHOD THEREOF

CROSS REFERENCE TO RELATED APPLICATIONS

This application is a Divisional of co-pending application Ser. No. 17/122,597, filed on Dec. 15, 2020, for which priority is claimed under 35 U.S.C. § 120; and this application claims priority of Application No. 202011260428.1 filed in China on Nov. 12, 2020 under 35 U.S.C. § 119, the entire contents of all of which are hereby incorporated by reference.

BACKGROUND OF THE INVENTION

1. Field of the Invention

The present invention relates to carbon fiber products, in particular to a method for manufacturing a luggage formed by composite material and a luggage formed by the manufacturing method.

2. Description of the Related Art

The luggage currently on the market is usually made of thermoplastic or aluminum-magnesium alloy. In the case of a luggage made of a thermoplastic material, the luggage is usually formed by a combination of two half shells. The manufacturer usually sews fabric on the inside of each half shell, pivots the two half shells to each other, and assembles wheels and handles to make a finished luggage. When the luggage is transported on the airport transportation line, it may be impacted or caused to fall. Therefore, the luggage made of thermoplastics (such as ABS resin) may be broken and damaged, causing inconvenience to the user, and the user may need to buy a new luggage for replacement.

In order to overcome the above-mentioned deficiencies, the applicant proposed luggage shell fabrication method on 2018 Jun. 20 (Taiwan Invention Patent No. 202003202A), which comprises the step of making a thermoplastic sheet into a shell using a vacuum molding method, the step of placing the shell in said female mold area of a heating mold to attach the outer surface of said shell to the inner wall surface in the female mold area, the step of applying a thermosetting plastic layer to the inner surface of the shell, and finally the step of placing an inflatable airbag in an accommodation chamber of the shell and then inflating the inflatable airbag against the thermosetting plastic layer and simultaneously operating the heating mold to heat the shell and the thermosetting plastic layer in the female mold area for causing the shell and the thermosetting plastic layer to be combined with each other to form a luggage shell. In this way, the structural strength is strengthened and the overall weight of the luggage shell is reduced.

In addition, in order to reinforce the strength of the corners of the luggage, for example, Taiwan utility model patent No. M579915 discloses a luggage corner protector. The corner protector is fixed on the outer surface of the corner of the luggage, so that the plastic shell of the luggage at the corner will not be directly impacted to reduce the problem of cracking at the corner.

SUMMARY OF THE INVENTION

The present invention has been accomplished under the circumstances in view. It is the main object of the present invention to provide a method for manufacturing a luggage formed by composite material, which has the advantage of better structural strength, especially when the external structure of the composite material molded luggage case is required to be uniform, it still has both impact resistance and collision resistance at the corner.

To achieve this and other objects of the present invention, a method for manufacturing a luggage formed by composite material, comprising the steps of: A) using a vacuum molding method to make a thermoplastic sheet into a shell, which comprises an outer surface, an inner surface, a receiving area surrounded by the inner surface, and a corner; B) providing a heating mold having an inner cavity mold area and placing the shell in the inner cavity mold area to correspond the outer surface of the shell to an inner wall surface of the inner cavity mold area; C) providing a thermosetting carbon fiber plastic layer, said thermosetting carbon fiber plastic layer comprising an outer surface and an inner surface, and then arranging the outer surface of said thermosetting carbon fiber plastic layer on the inner surface of said shell; D) providing a reinforcing layer and setting the reinforcing layer on the inner surface of the thermosetting carbon fiber plastic layer at the location corresponding to the corner of the shell; and E) placing an airbag in the receiving area of the shell and inflate the airbag to support the inner surface of the thermosetting carbon fiber plastic layer and the reinforcing layer, and at the same time heating the heating mold to heat the shell, the thermosetting carbon fiber plastic layer and the reinforcing layer in the inner cavity mold area, so that the shell, the thermosetting carbon fiber plastic layer and the reinforcing layer are combined with each other.

Preferably, in step D), the reinforcing layer is a thermosetting carbon fiber plastic.

Preferably, in step E), the thermosetting carbon fiber plastic layer is cured and bonded to the inner surface of the shell when heated by the heating mold.

Preferably, the reinforcing layer is a metal layer, and the method for manufacturing a luggage formed by composite material further comprises a steps of: providing another thermosetting carbon fiber plastic layer, placing the another thermosetting carbon fiber plastic layer on the inner surface of the thermosetting carbon fiber plastic layer and the metal layer, inflating the airbag to support the said another thermosetting carbon fiber plastic layer, and heating the heating mold to heat the shell, the two thermosetting carbon fiber plastic layers and the metal layer, so that the shell and the two thermosetting carbon fiber plastic layers are combined with each other and the metal layer is wrapped in between the two thermosetting carbon fiber plastic layers.

Preferably, in step E), the heating temperature of the inner cavity mold area is between 140 degrees and 150 degrees.

Preferably, in step A), the thermoplastic sheet is transparent.

Preferably, the method for manufacturing a luggage formed by composite material further comprises a step of providing a pattern. The pattern is set on the inner surface of the shell by painting, printing or labeling.

Preferably, in step A), the vacuum molding method is to provide a vacuum molding device with a mold, and put the thermoplastic sheet into the vacuum molding device to heat and soften the thermoplastic sheet, and then the vacuum molding device generates a negative pressure so that the thermoplastic sheet is attached to the surface of the mold surface made into the shell.

Preferably, the method for manufacturing a luggage formed by composite material, after step E), further comprising step F) moving the airbag out of the receiving area of shell and cooling the luggage formed of the shell, the thermosetting carbon fiber plastic layer and the reinforcing layer.

Preferably, the invention further provides a luggage made by the method for manufacturing a luggage formed by composite material. The luggage comprises a shell, a thermosetting carbon fiber plastic layer, and a reinforcing layer. The shell comprises an outer surface, an inner surface, a receiving area surrounded by the inner surface, and a corner. The thermosetting carbon fiber plastic layer comprises an outer surface and an inner surface. The outer surface of the thermosetting carbon fiber plastic layer is set on the inner surface of the shell. The reinforcing layer is set on the inner surface of the thermosetting carbon fiber plastic layer at the location corresponding to the corner of the shell.

From the above we can see that the present invention uses the composite carbon fiber manufacturing method to make the luggage. Under the premise that the external structure of the luggage formed by composite materials is unified, it utilizes the impact resistance characteristics of the thermoplastic sheet, and the high strength and high bonding characteristics of the thermosetting carbon fiber plastic layer, and applies the reinforcing layer (thermosetting carbon fiber plastic layer or metal layer) at a specific location according to the needs to achieve better impact resistance and impact resistance.

The detailed structure and features provided by the present invention will be described in the detailed description of the subsequent embodiments. However, those with ordinary knowledge in the art should be able to understand that such detailed descriptions and specific embodiments listed in the present invention are only used to illustrate the present invention, but not to limit the scope of the patent application of the present invention.

DETAILED DESCRIPTION OF THE INVENTION

Figure 1:
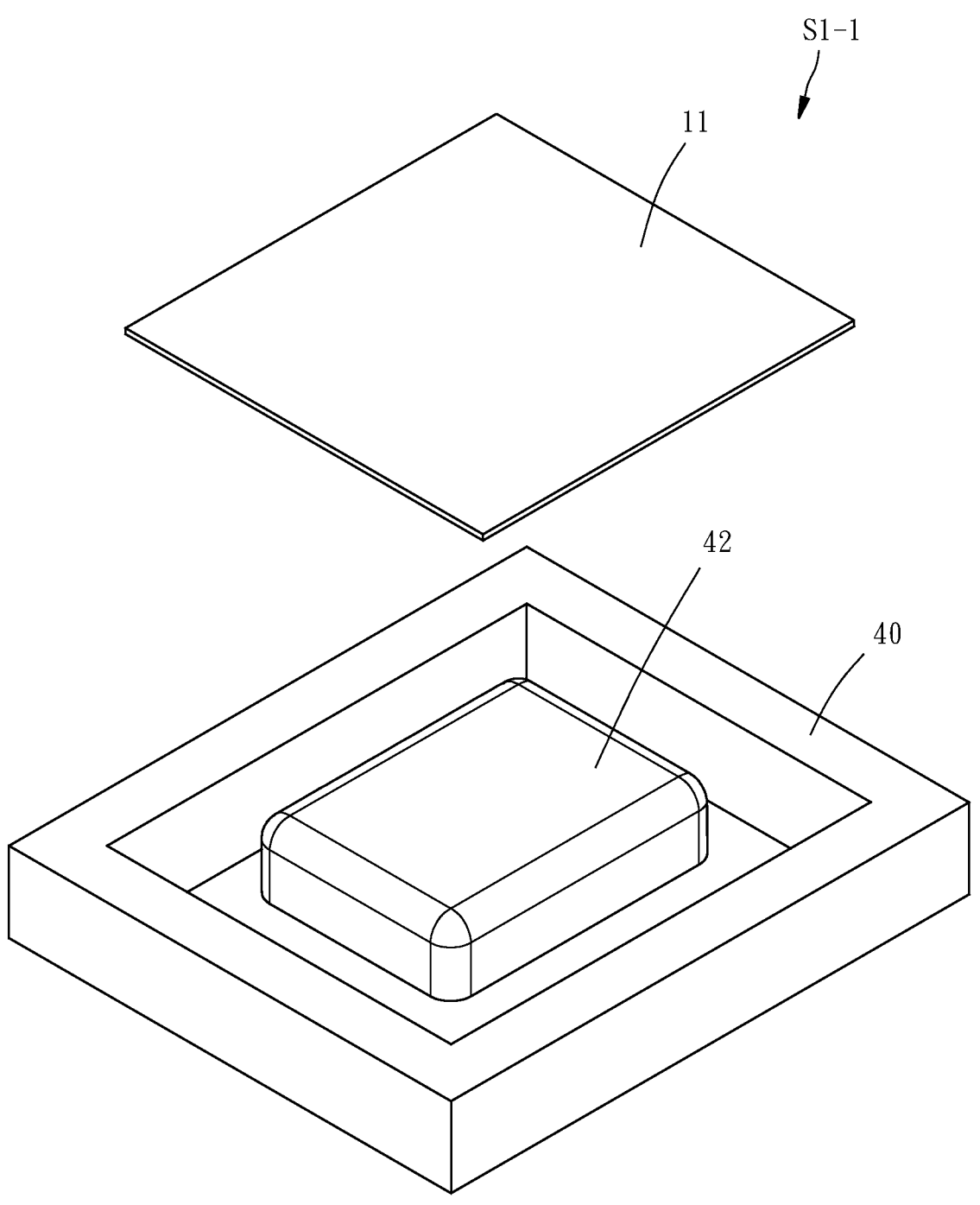
FIGS. 1 to 3 are schematic diagrams of a method for manufacturing a composite material molded luggage in accordance with a first preferred embodiment of the present invention, which uses a vacuum molding method to make a thermoplastic sheet into a shell.

The applicant first explains here that throughout the specification, including the embodiments described below and the claims in the scope of the patent application, the nouns related to directionality are based on the directions in the drawings. Secondly, in the embodiments and drawings to be introduced below, the same element numbers represent the same or similar elements or their structural features.

Figure 2:
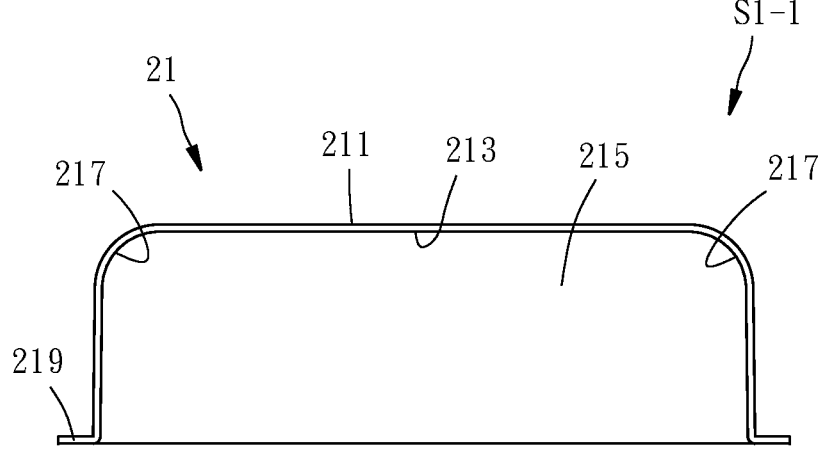
Figure 3:
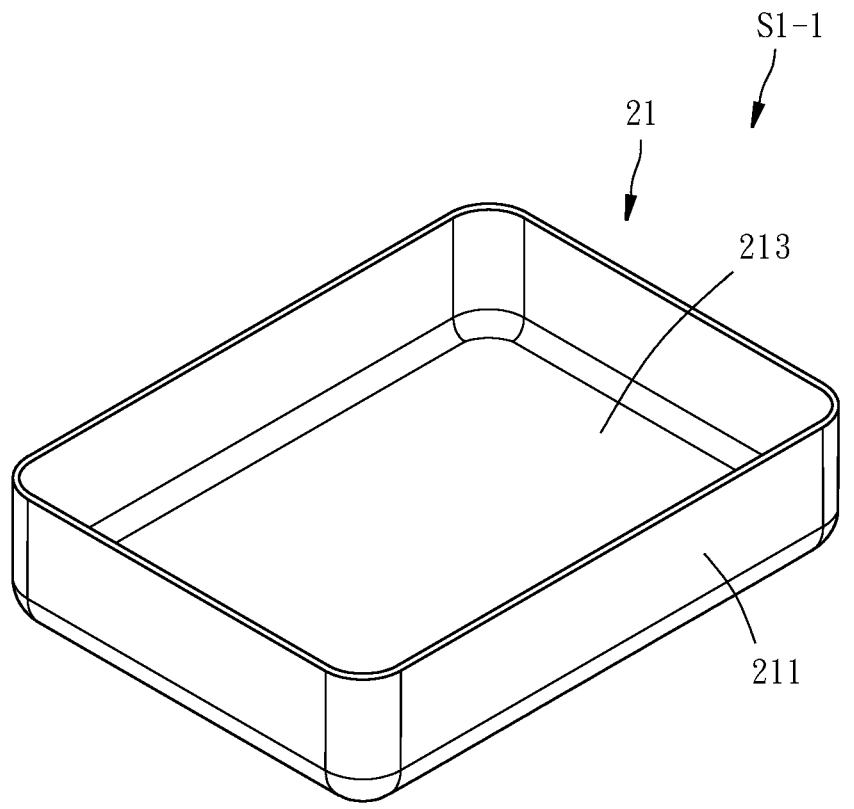

Referring to FIGS. 1-10, a method for manufacturing a luggage 10 formed by composite material in accordance with a first preferred embodiment of the present invention includes the following steps:

Step S1-1: As shown in FIGS. 1-3, use a vacuum molding method to make a thermoplastic sheet 20 into a shell 21. The shell 21 has an outer surface 211, an inner surface 213, a receiving area 215 surrounded by the inner surface 213, and a corner 217. The material of the thermoplastic sheet 20 is selected from PP (polypropylene), ABS resin (Acrylonitrile Butadiene Styrene), PC (polycarbonate) or a combination thereof. Of course, other thermoplastics or combinations of thermoplastics are also covered by the present invention. Furthermore, the vacuum molding method (also known as blister process) provided in the first embodiment provides a vacuum molding device 40 with a mold 42. The mold is a male mold, and other auxiliary molds (such as ribs) can be set on the male mold to produce shells 21 of different shapes. Wherein, the thermoplastic sheet 20 needs to be put into the vacuum molding device 40 to be heated and softened, and then the vacuum molding device 40 generates a negative pressure so that the thermoplastic sheet 20 is attached to the surface of the mold 42 to form the shell 21. The technical content that the vacuum molding device 40 heats and softens the thermoplastic sheet 20 and generates a negative pressure to attach the thermoplastic sheet 20 to the surface of the mold 42 to form the shell 21 is a known technique, and will not be repeated here. In addition, when the vacuum molding device 40 is used to make the shell 21, there will be a material edge 219 around the shell 21, as shown in FIG. 2, so a secondary processing process is usually performed to cut the material edge 219 to form the shell 21 shown in FIG. 3.

Figure 4:
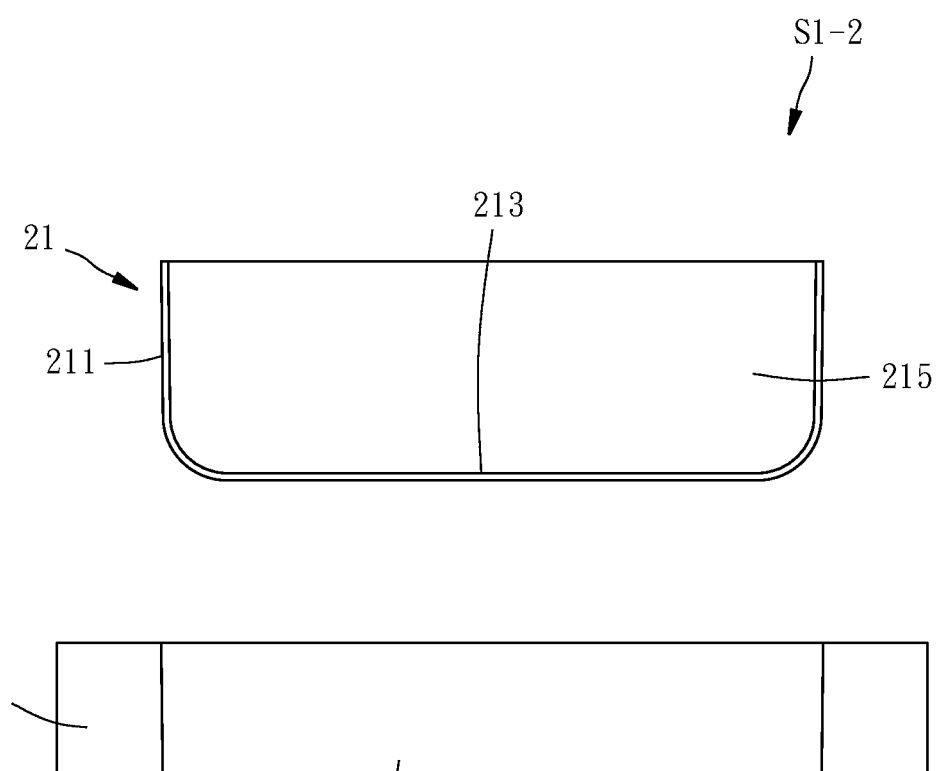
FIGS. 4 to 5 are schematic diagrams of the method for manufacturing a composite material molded luggage of the first preferred embodiment of the present invention, where the shell is set in the heating mold.
Figure 5:
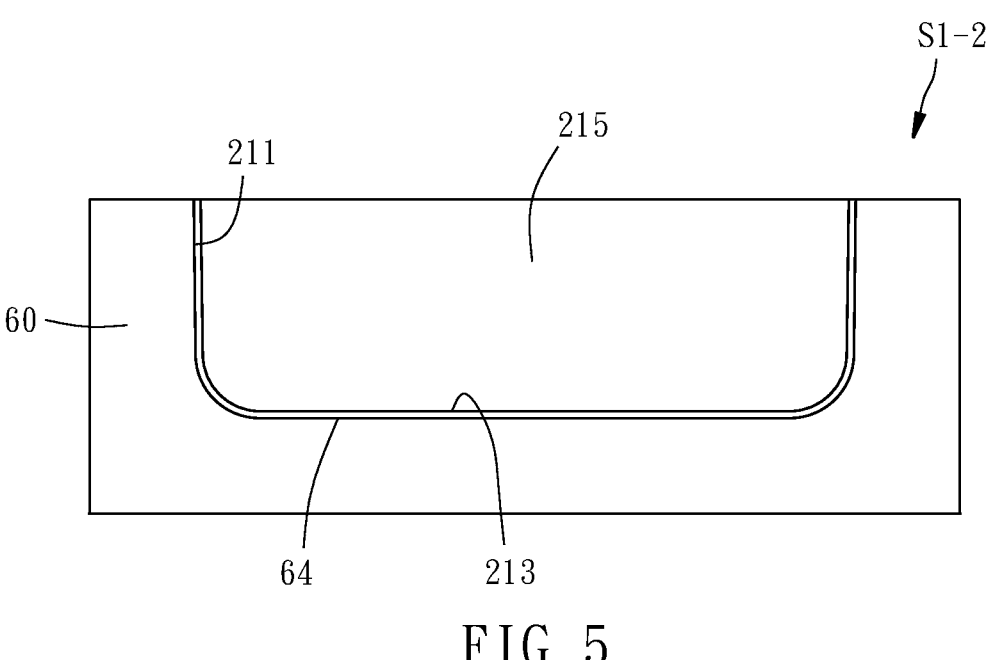

Step S1-2: As shown in FIGS. 4 and 5, provide a heating mold 60 having an inner cavity mold area 62, and then set the shell 21 in the inner cavity mold area 62 to correspond the outer surface 211 of the shell 21 to the inner wall surface 64 of the inner cavity mold area 62. In addition, if you want to display a pattern on the shell 21 (such as a trademark or a styling pattern), you can select a transparent thermoplastic sheet 20 in step S1-1, and then make the thermoplastic sheet 20 into a shell 21, and in step S1-1 or in step S1-2, set a pattern on the inner surface 213 of the shell 21 by spray painting, printing or labeling.

Figure 6:
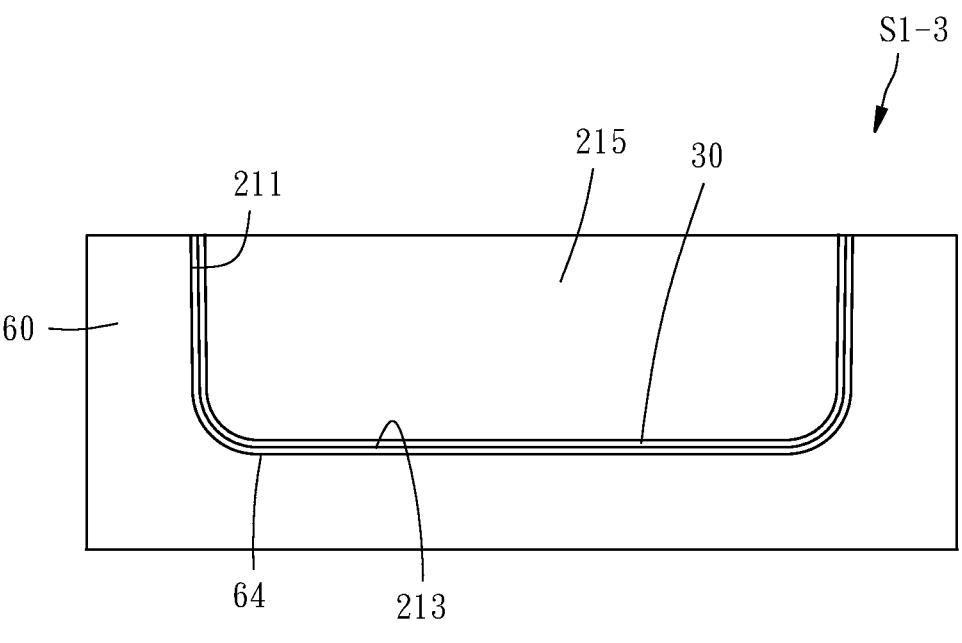
FIG. 6 is a schematic diagram of the method for manufacturing a composite material molded luggage of the first preferred embodiment of the present invention, where the thermosetting carbon fiber plastic layer is set on the inner surface of the shell.

Step S1-3: As shown in FIG. 6, provide a thermosetting carbon fiber plastic layer 30 that has an outer surface and an inner surface, and then arrange the outer surface of the thermosetting carbon fiber plastic layer 30 on the inner surface 213 of the shell 21. The thermosetting plastic of thermosetting carbon fiber plastic layer 30 is selected from epoxy resin or polyester, of course, other thermosetting plastics or combinations of thermosetting plastics are also covered by the present invention.

Figure 7:
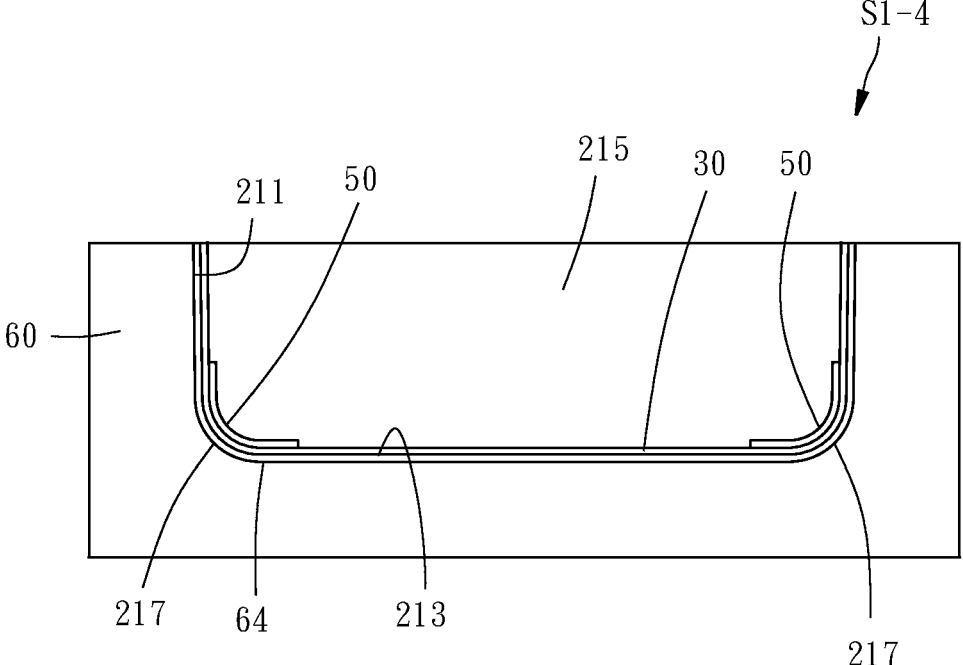
FIG. 7 is a schematic diagram of the method for manufacturing a composite material molded luggage of the first preferred embodiment of the present invention, where the reinforcing layer (thermosetting carbon fiber plastic layer) is set on the inner surface of the thermosetting carbon fiber plastic layer at the location corresponding to the corner of the shell.

Step S1-4: As shown in FIG. 7, provide a reinforcing layer 50. In the first embodiment, the reinforcing layer 50 is a thermosetting carbon fiber plastic. Then, place the reinforcing layer 50 on the inner surface of the thermosetting carbon fiber plastic layer 30 and locate it at the corner 217 of the shell 21. This will reinforce the corner 217 that is most vulnerable to damage.

Figure 8:
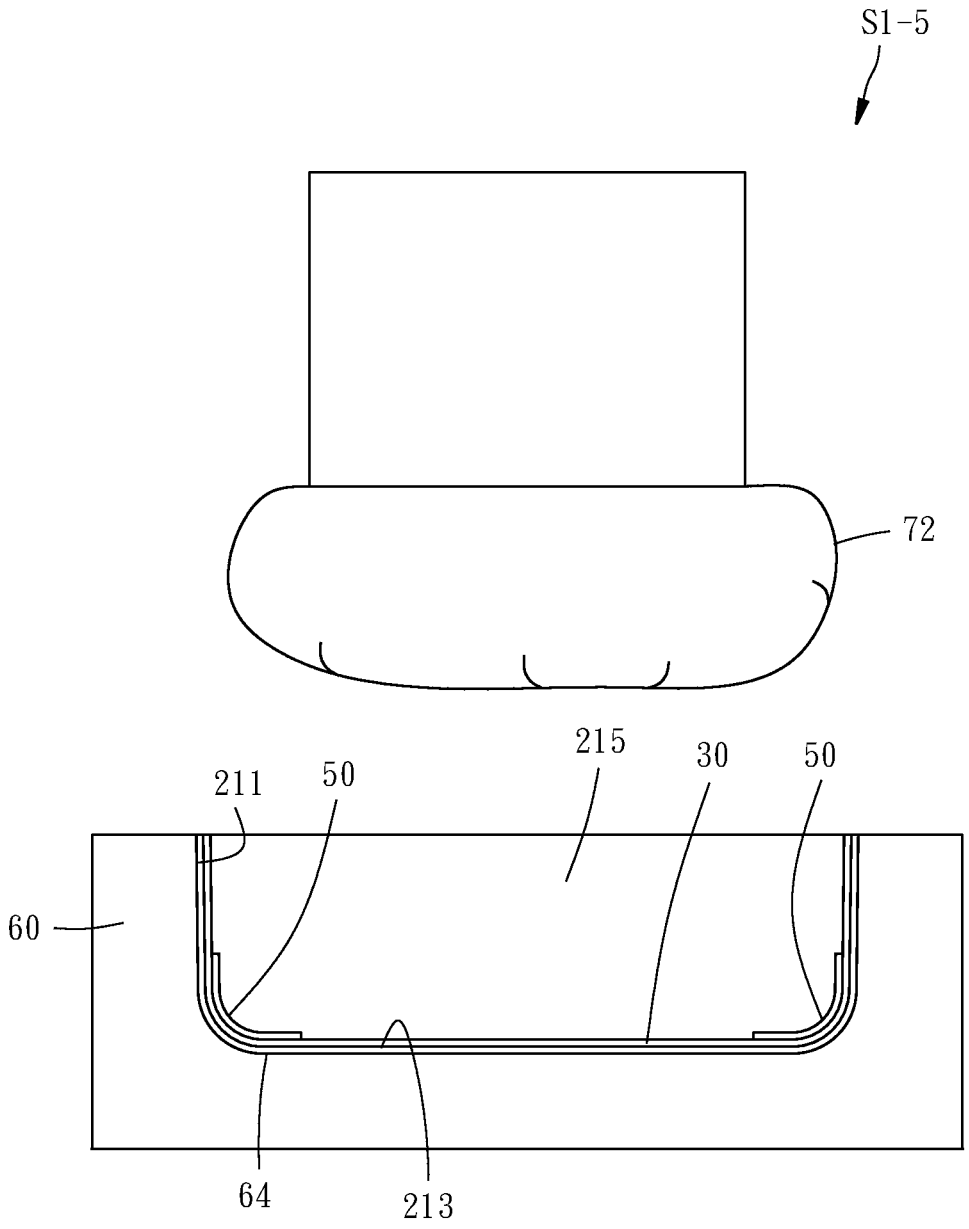
FIGS. 8 to 9 are schematic diagrams of the method for manufacturing a composite material molded luggage of the first preferred embodiment of the present invention, where the airbag is inflated and abutted against the thermosetting carbon fiber plastic layer and the reinforcing layer.
Figure 9:
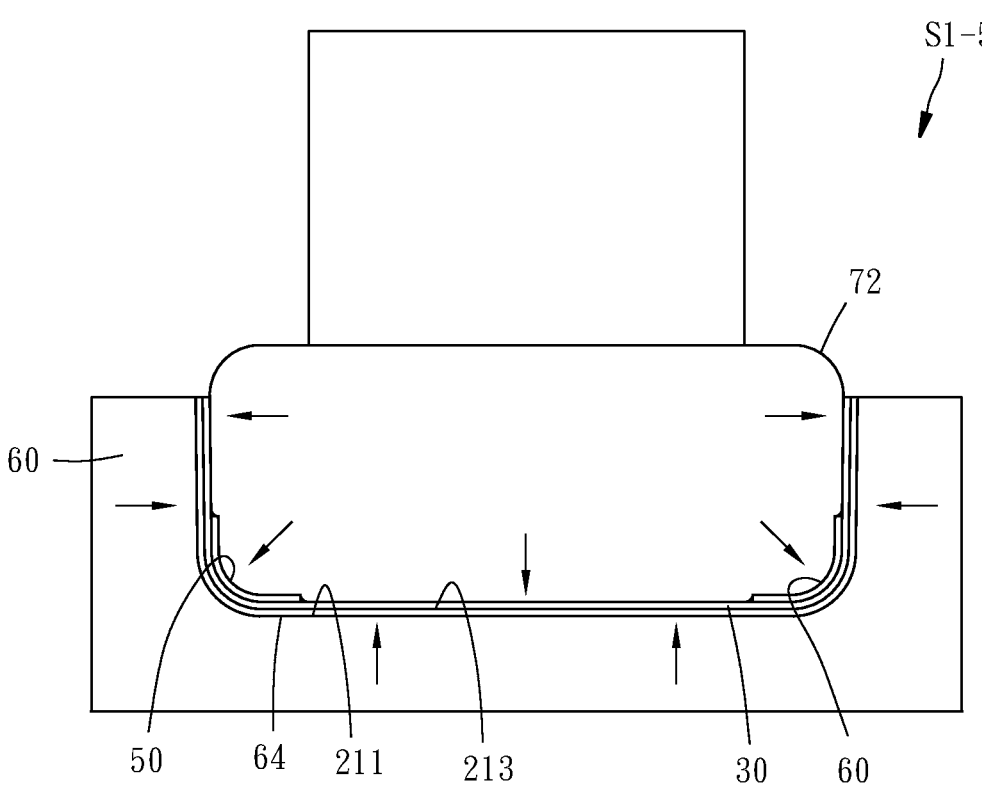

Step S1-5: As shown in FIGS. 8 and 9, place an airbag 72 in the receiving area 215 of the shell 21, and inflate the airbag 72 to support the inner surface of the thermosetting carbon fiber plastic layer 30 and the reinforcing layer 50, and then heat the heating mold 60 to heat the shell 21, the thermosetting carbon fiber plastic layer 30 and the reinforcing layer 50 in the inner cavity mold area 62, so that the shell 21, the thermosetting carbon fiber plastic layer 30 and the reinforcing layer 50 are combined with each other. The preferred heating temperature is between 140° C. and 150° C., so that the thermosetting carbon fiber plastic layer 30 and the reinforcing layer 50 are cured and bonded to the inner surface 213 of the shell 21, so that the shell 21 and thermosetting carbon fiber plastic layer 30 and reinforcing layer 50 are combined with each other to make a luggage 10 made of composite material.

Figure 10:
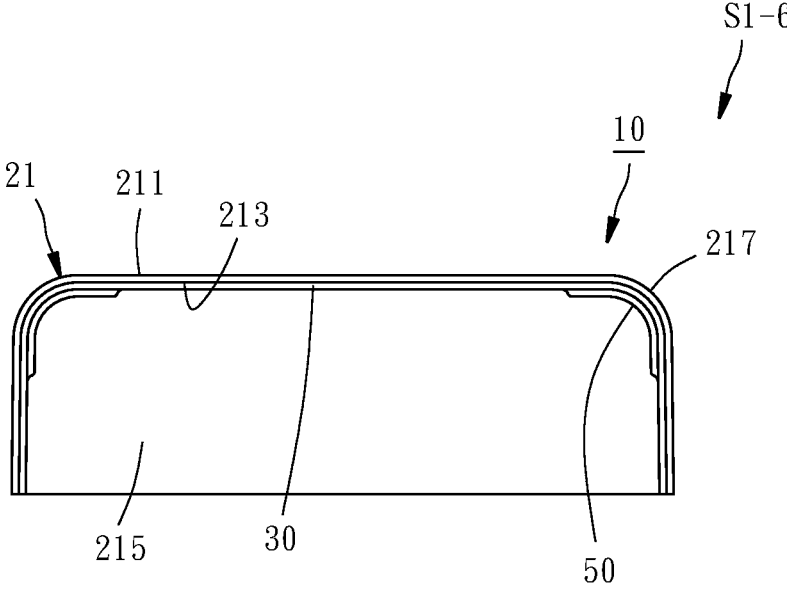
FIG. 10 is a sectional view of a luggage made according to the method for manufacturing a composite material molded luggage in accordance with the first preferred embodiment of the present invention.
Figure 11:
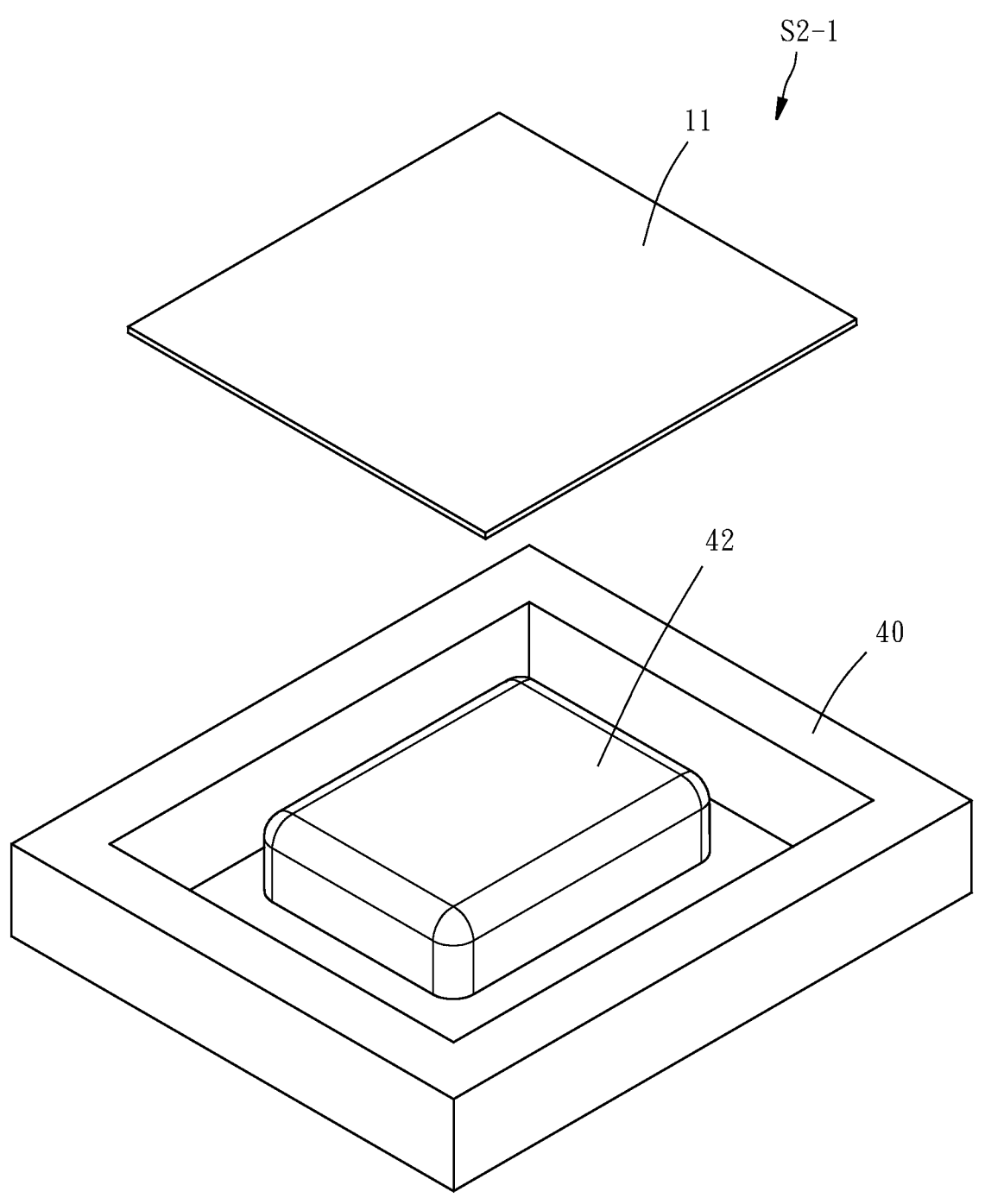
FIGS. 11 to 16 are schematic diagrams of a method for manufacturing a composite material molded luggage in accordance with a second preferred embodiment of the present invention, which are similar to the method shown in FIGS. 1 to 6.
Figure 12:
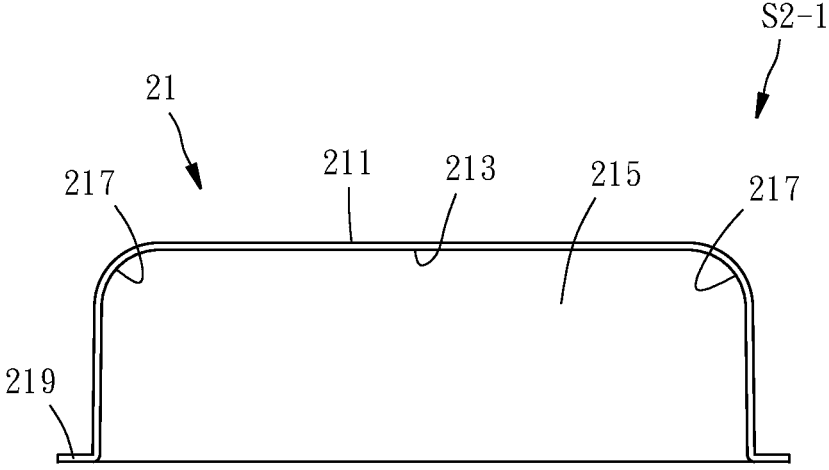
Figure 13:
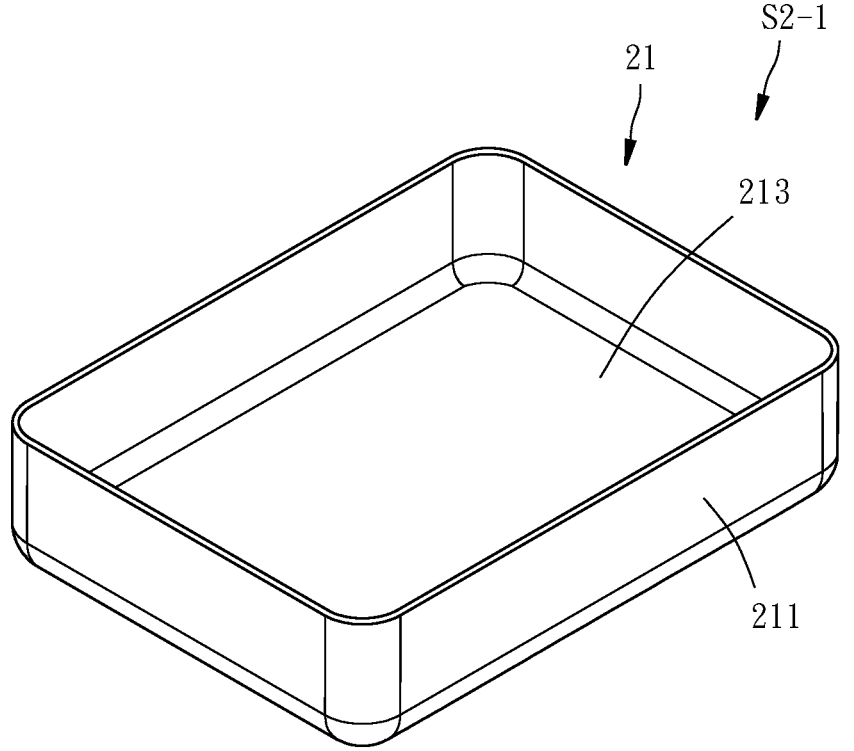
Figure 14:
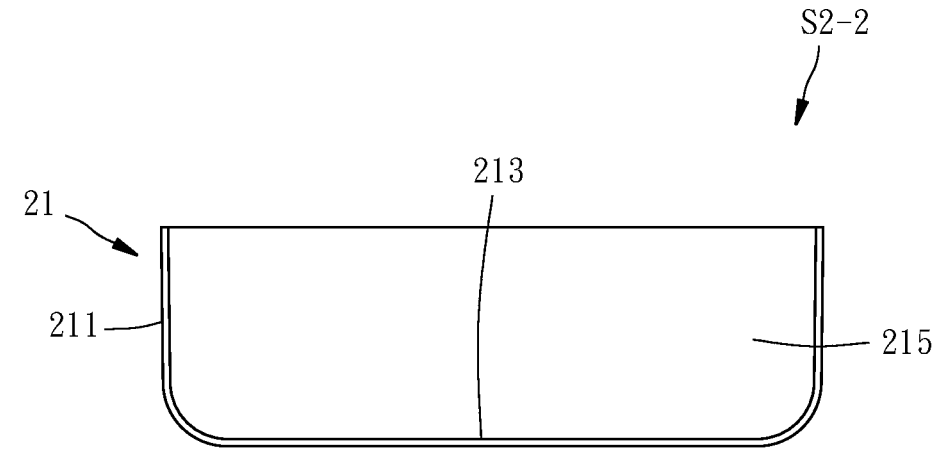
Figure 14:
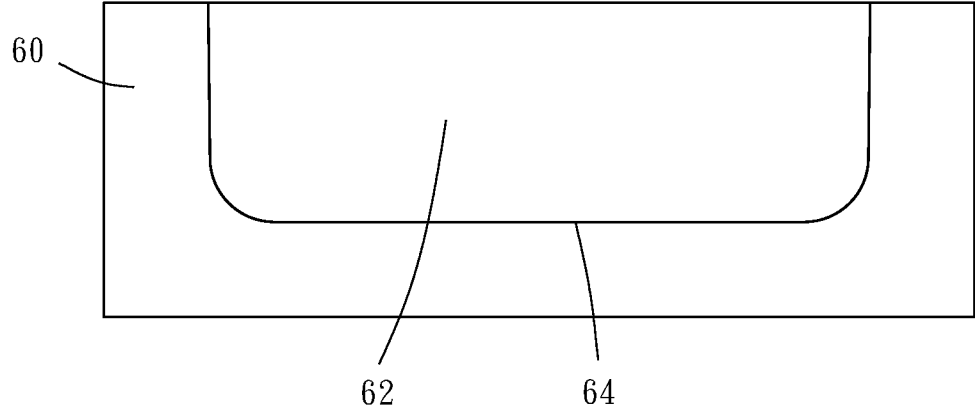
Figure 15:
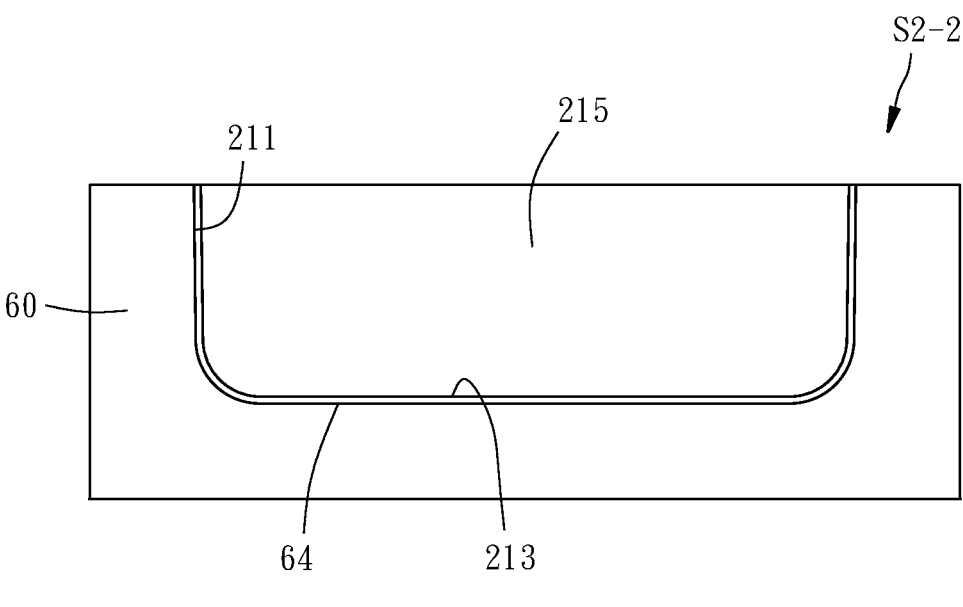
Figure 16:
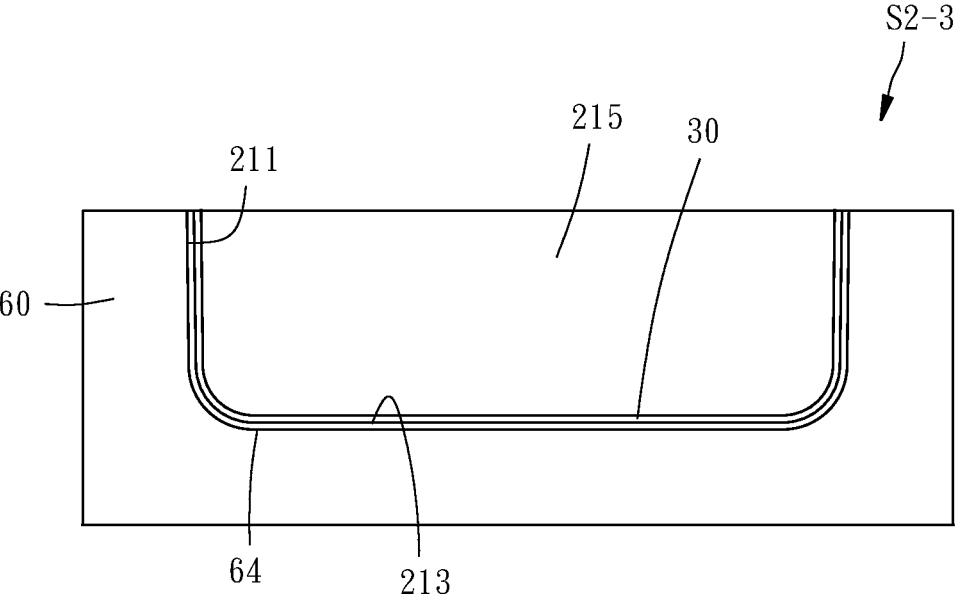

Step S1-6: As shown in FIGS. 9 and 10, move the airbag 72 out of the receiving area 215 of the shell 21, and cool the luggage 10 made of composite material to complete the manufacturing process of the luggage 10 made of composite material.

Referring to FIGS. 11-21, a method for manufacturing a composite material molded luggage 10' in accordance with a second preferred embodiment of the present invention includes the following steps:

Step S2-1~S2-3: As shown in FIGS. 11-16, steps S2-1 to S2-3 of the second preferred embodiment of the present invention are the same as steps S1-1 to S1-3 of the first preferred embodiment, so they will not be repeated.

Figure 17:
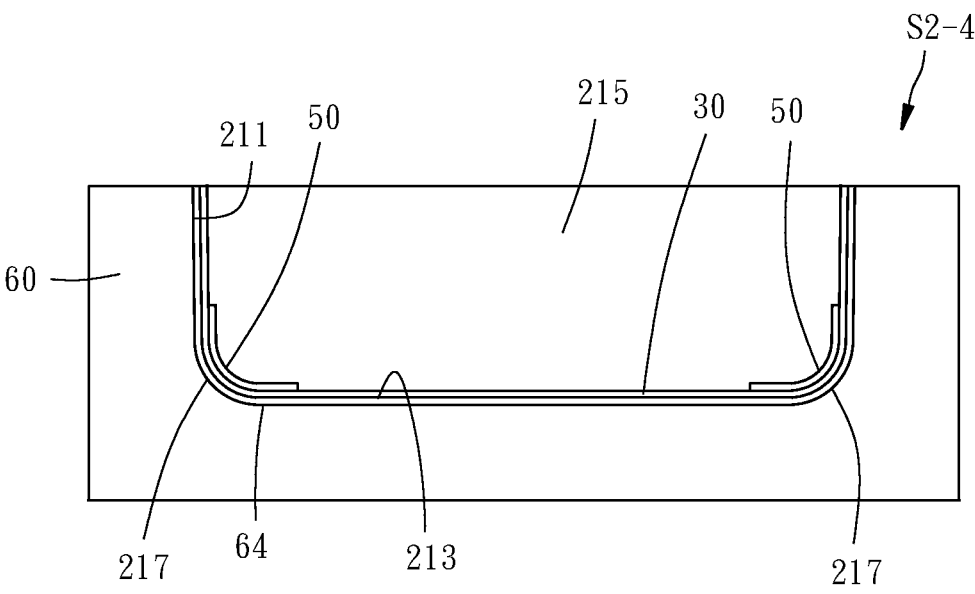
FIG. 17 is a schematic diagram of the method for manufacturing a composite material molded luggage of the second preferred embodiment of the present invention, where the reinforcing layer (metal layer) is set on the inner surface of the thermosetting carbon fiber plastic layer at the location corresponding to the corner of the shell.

Step S2-4: As shown in FIG. 17, provide a reinforcing layer 50. In the second embodiment, the reinforcing layer 50 is a metal layer, and it can also be Kevlar fiber. Then, place the reinforcing layer 50 on the inner surface of the thermosetting carbon fiber plastic layer 30 and locate it at the corner 217 of the shell 21.

Figure 18:
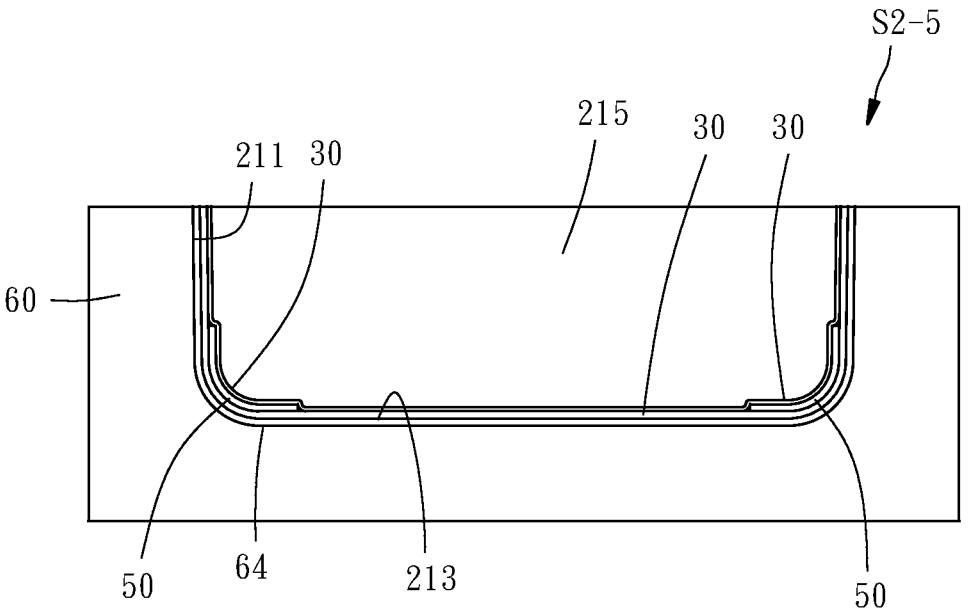
FIG. 18 is a schematic diagram of the method for manufacturing a composite material molded luggage of the second preferred embodiment of the present invention, where another thermostting carbon fiber plastic layer is set on the inner surface of the shell and the reinforcing layer.

Step S2-5: As shown in FIG. 18, provide another thermosetting carbon fiber plastic layer 30 and arrange this another thermosetting carbon fiber plastic layer 30 on the inner surface of the thermosetting carbon fiber plastic layer 30 and the reinforcing layer 50.

Figure 19:
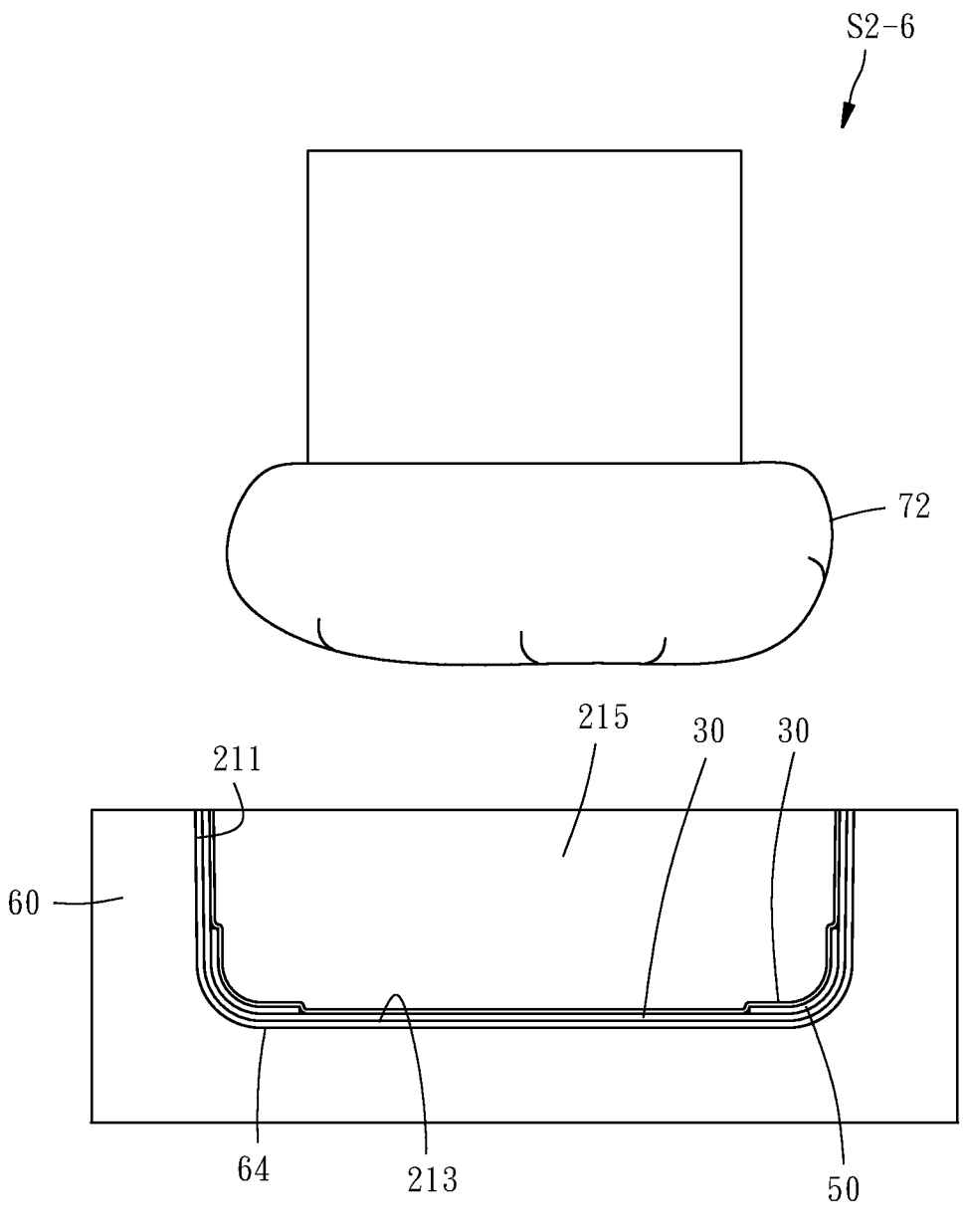
FIGS. 19 to 20 are schematic diagrams of the method for manufacturing a composite material molded luggage of the second preferred embodiment of the present invention, where the airbag is inflated and abutted against the thermosetting carbon fiber plastic layer.
Figure 20:
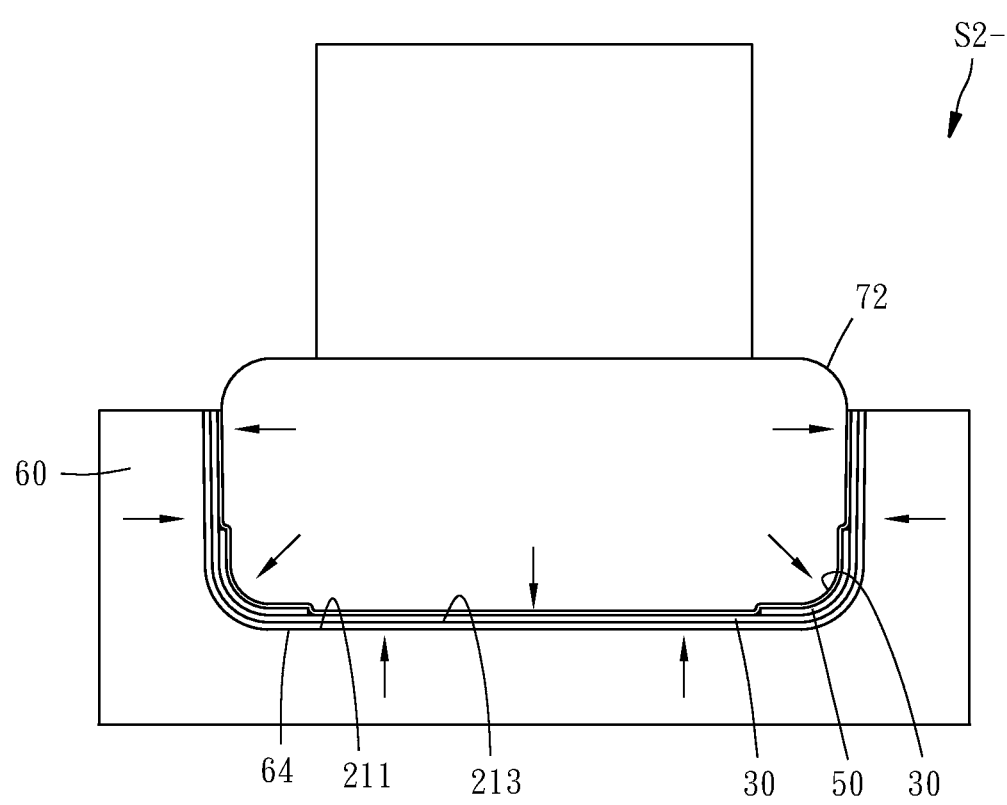

Step S2-6: As shown in FIGS. 19 and 20, place an airbag 72 in the receiving area 215 of the shell 21, and inflate the airbag 72 to support the said another thermosetting carbon fiber plastic layer 30, and then heat the heating mold 60 to heat the shell 21, the two thermosetting carbon fiber plastic layers 30 and the reinforcing layer 50 in the inner cavity mold area 62, so that the shell 21, the two thermosetting carbon fiber plastic layers 30 and the reinforcing layer 50 are combined with each other and the reinforcing layer 50 is wrapped in between the two thermosetting carbon fiber plastic layers 30.

Figure 21:
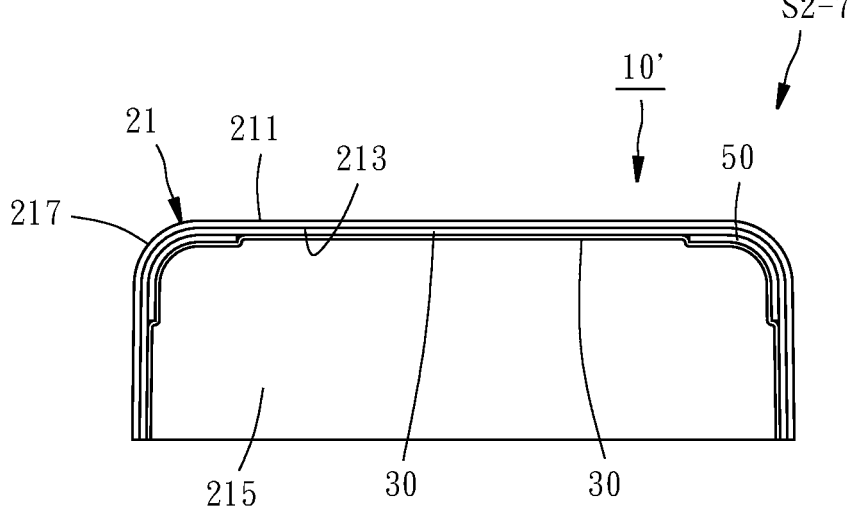
FIG. 21 is a sectional view of a luggage made according to the method for manufacturing a composite material molded luggage in accordance with the second preferred embodiment of the present invention.

Step S2-7: As shown in FIGS. 20 and 21, move the airbag 72 out of the receiving area 215 of the shell 21, and cool the luggage 10' made of composite material to complete the manufacturing process of the luggage 10' made of composite material.

In conclusion, the present invention uses the composite carbon fiber manufacturing method to make the luggage 10, 10'. Under the premise that the external structure of the luggage 10, 10' formed by composite materials is unified, it utilizes the impact resistance characteristics of the thermoplastic sheet 20, and the high strength and high bonding characteristics of the thermosetting carbon fiber plastic layer 30, and applies the reinforcing layer (thermosetting carbon fiber plastic layer or metal layer) 50 at a specific location according to the needs to achieve better impact resistance and impact resistance.

What is claimed is:

1. A method for manufacturing a luggage formed by composite material, comprising the steps of:

A) using a vacuum molding method to make a thermoplastic sheet into a shell, said shell comprising an outer surface, an inner surface, a receiving area surrounded by said inner surface, and a corner;

B) providing a heating mold, said heating mold comprising an inner cavity mold area and then placing said shell in said inner cavity mold area to correspond said outer surface of said shell to an inner wall surface of said inner cavity mold area;

C) providing a thermosetting carbon fiber plastic layer, said thermosetting carbon fiber plastic layer comprising an outer surface and an inner surface, and then arranging the outer surface of said thermosetting carbon fiber plastic layer on the inner surface of said shell;

D) providing a reinforcing layer and setting said reinforcing layer on the inner surface of said thermosetting carbon fiber plastic layer at the location corresponding to said corner of said shell; and E) placing an airbag in said receiving area of said shell and inflate said airbag to support the inner surface of said thermosetting carbon fiber plastic layer and said reinforcing layer, and at the same time heating said heating mold to heat said shell, said thermosetting carbon fiber plastic layer and said reinforcing layer in said inner cavity mold area, so that said shell, said thermosetting carbon fiber plastic layer and said reinforcing layer are combined with each other, wherein said reinforcing layer is a metal layer; the method for manufacturing a luggage formed by composite material further comprising a steps of: providing another thermosetting carbon fiber plastic layer, placing the said another thermosetting carbon fiber plastic layer on the inner surface of said thermosetting carbon fiber plastic layer and said metal layer, inflating said airbag to support the said another thermosetting carbon fiber plastic layer, and heating said heating mold to heat said shell, said two thermosetting carbon fiber plastic layers and said metal layer, so that said shell and said two thermosetting carbon fiber plastic layers are combined with each other and said metal layer is wrapped in between said two thermosetting carbon fiber plastic layers.

2. The method for manufacturing a luggage formed by composite material as claimed in claim 1, wherein said reinforcing layer is a thermosetting carbon fiber plastic.

3. The method for manufacturing a luggage formed by composite material as claimed in claim 1, wherein in step E), said thermosetting carbon fiber plastic layer is cured and bonded to the inner surface of said shell when heated by said heating mold.

4. The method for manufacturing a luggage formed by composite material as claimed in claim 1, wherein in step E), the heating temperature of said inner cavity mold area is between 140 degrees and 150 degrees.

5. The method for manufacturing a luggage formed by composite material as claimed in claim 1, wherein in step A), said thermoplastic sheet is transparent.

6. The method for manufacturing a luggage formed by composite material as claimed in claim 1, further comprising a step of providing a pattern, said pattern being set on the inner surface of said shell selectively by painting, printing or labeling.

7. The method for manufacturing a luggage formed by composite material as claimed in claim 1, wherein in step A), said vacuum molding method is to provide a vacuum molding device with a mold, and put said thermoplastic sheet into said vacuum molding device to heat and soften said thermoplastic sheet, and then said vacuum molding device generates a negative pressure so that said thermoplastic sheet is attached to the surface of said mold surface made into said shell.

8. The method for manufacturing a luggage formed by composite material as claimed in claim 1, after step E), further comprising step F) moving said airbag out of said receiving area of shell, and cooling the luggage formed of said shell, said thermosetting carbon fiber plastic layer and said reinforcing layer.

* * * * *